United States Patent
Ford et al.

(10) Patent No.: US 6,872,771 B1
(45) Date of Patent: Mar. 29, 2005

(54) TIRE WITH RUBBER CONTAINING FLAVONE

(75) Inventors: Barbara Ann Ford, Akron, OH (US); Paul Harry Sandstrom, Cuyahoga Falls, OH (US); Lawson Gibson Wideman, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 268 days.

(21) Appl. No.: 10/226,053

(22) Filed: Aug. 22, 2002

(51) Int. Cl.$^7$ ................................................. C08K 3/04
(52) U.S. Cl. ........................ 524/495; 524/496; 524/493; 524/100
(58) Field of Search ................. 524/495, 493, 524/496, 100

(56) References Cited

U.S. PATENT DOCUMENTS

| | | | |
|---|---|---|---|
| 4,324,710 A | 4/1982 | Davis et al. | 524/76 |
| 4,435,477 A | 3/1984 | Davis | 428/462 |
| 5,102,956 A | 4/1992 | Holmes-Farley | 525/285 |
| 5,688,871 A | 11/1997 | Inui et al. | 525/346 |

FOREIGN PATENT DOCUMENTS

| | | | | |
|---|---|---|---|---|
| EP | 0 672 713 A1 | 9/1995 | | C08K/5/15 |
| EP | 1 216 851 A1 | 6/2002 | | B60C/1/00 |

*Primary Examiner*—Katarzyna Wyrozebski
(74) *Attorney, Agent, or Firm*—John D. DeLong

(57) ABSTRACT

The invention relates to a pneumatic tire having a component comprising a rubber containing the reaction product of a flavone and a methylene donor.

22 Claims, No Drawings

TIRE WITH RUBBER CONTAINING FLAVONE

FIELD OF THE INVENTION

This invention relates to a pneumatic tire having a component containing a rubber composition comprising a flavone. More specifically, the invention relates to a pneumatic tire having a component comprising a rubber containing the reaction product of a flavone and a methylene donor.

BACKGROUND OF THE INVENTION

A tire is a composite of several components each serving a specific and unique function yet all synergistically functioning to produce the desired performance. In several tire components, an in-situ resin is included in a rubber composition to impart desirable properties to the rubber composition, including hardness, tear strength, and adhesion to reinforcement. Typically, resorcinol-methylene donor systems are used as in-situ resins. Unfortunately, resorcinol is a volatile material and is therefore desirable to remove from the workplace. Therefore, there exists a need for a resorcinol replacement without sacrificing the beneficial properties resulting from its use.

SUMMARY OF THE INVENTION

The present invention relates to a pneumatic tire having a component comprising a rubber containing the reaction product of a flavone and a methylene donor.

DETAILED DISCLOSURE OF THE INVENTION

There is disclosed a pneumatic tire having a component containing a rubber composition comprising (A) a sulfur-vulcanized rubber compound; and
(B) the reaction product of
  (1) a flavone; and
  (2) a methylene donor selected from the group consisting of hexaethoxymethylmelamine, hexamethylenetetramine, hexamethoxymethylmelamine, iminomethoxymethylmelamine, iminoisobutoxymethylmelamine, lauryloxymethylpyridinium chloride, ethoxymethylpyridinium chloride, trioxan hexamethoxymethylmelamine and N-substituted oxymethyl melamines of the formula:

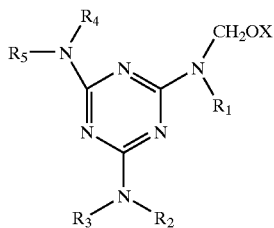

wherein X is hydrogen or an alkyl having from 1 to 8 carbon atoms, $R_1$, $R_2$, $R_3$, $R_4$ and $R_5$ are individually selected from the group consisting of hydrogen, an alkyl having from 1 to 8 carbon atoms, the group —$CH_2OX$ and their condensation products.

The present invention relates to a pneumatic tire. Pneumatic tire means a laminated mechanical device of generally toroidal shape (usually an open torus) having beads and a tread and made of rubber, chemicals, fabric and steel or other materials. The present invention relates to both bias and radial-ply tires. Preferably, the present invention is a radial-ply tire. Radial-ply tire means a belted or circumferentially-restricted pneumatic tire in which the carcass ply cords which extend from bead to bead are laid at cord angles between 65° and 90° with respect to the equatorial plane of the tire.

The rubber composition for use in the tire component may contain a natural or synthetic diene derived rubber. Representative of the rubbers include medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber, carboxylated acrylonitrile-butadiene rubber and mixtures thereof. Preferably, the rubber is natural rubber, styrene-butadiene rubber or cis-polybutadiene.

The component of the tire of the present invention contains the reaction product of a flavone and methylene donor.

A flavone is an essential component in the present invention. Such chemicals are commercially available from Indofine Chemical Company, Inc. Flavones are naturally occurring substances found in a variety of plants. Flavones are generally described by the formula (I),

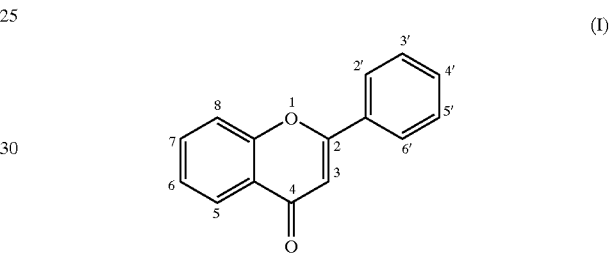

(I)

with various substitution of functional groups at the 1-8 and 2'-6' ring carbons.

Flavones useful in the present invention may include one or more of the following: acacetin (5,7-dihydroxy-4'-methoxyflavone, linarigenin), amentoflavone trihydrate, amentoflavone-7,4,4'-trimethyl ether (sciadopitysin), apigenin (5,7,4'-trihydroxyflavone), apigenin-7-glucoside (apigetrin, cosmetin, cosmiin), apiin (apigenin-7-apioglucoside), avicularin (quercetin-3-arabinoside), baicalein (5,6,7-trihydroxyflavone), baicalein trimethyl ether (5,6,7-trimethoxyflavone), baicalin (baicalein-7-O-glucuronide), 5,6-benzoflavone (β-naphthoflavone), 7,8-benzoflavone (α-naphthoflavone), 3'-benzyloxy-5,7-dihydroxy-3',4'-dimethoxyflavone, 3'-benzyloxy-5,6,7,4'-tetramethoxyflavone, 6-bromo-4'-chloroflavone, 6-bromoflavone 8-carboxy-3-methylflavone (3-methylflavone-8-carboxylic acid), 4'-chloro-6,8-dibromoflavone, 4'-chloroflavone, 6-chloroflavone, 4'-chloro-6-methylflavone, 6-chloro-7-methylflavone, chrysoeriol, cupressuflavone trihydrate, datiscetin, datiscoside, 6,8-dibromoflavone, 6,4'-dichloroflavone, 6,8-dichloroflavone, 6,4'-dichloro-7-methylflavone, 3,7-dihydroxy-3',4'-dimethoxyflavone (fisetin-3',4'-dimethyl ether), 3,5-dihydroxyflavone, 3,6-dihydroxyflavone, 3,7-dihydroxyflavone, 3,2'-dihydroxyflavone, 3,3'-dihydroxyflavone, 5,7-dihydroxyflavone (chrysin), 5,2'-dihydroxyflavone, 5,3'-dihydroxyflavone, 5,4'-dihydroxyflavone, 6,7-dihydroxyflavone, 6,2'-dihydroxyflavone, 6,3'-dihydroxyflavone, 6,4'-dihydroxyflavone, 7,8-dihydroxyflavone, 7,2'-dihydroxyflavone, 7,3'-dihydroxyflavone, 7,4'-dihydroxyflavone, 2',3'-dihydroxyflavone, 2',4'- dihydroxyflavone, 3',4'-dihydroxyflavone (4-hydroxyflavonol), 5,6-dihydroxy-7-methoxyflavone (baicalein-7-methyl ether), 5,4'-dihydroxy-7-methoxyflavone (genkwanin; 7-methoxyapigenin), 3',4'-dihydroxy-a-naphthoflavone, 3',4'-dihydroxy-b-naphthoflavone, 5,8-dihydroxy-3,7,3',4'-tetramethoxyflavone (gossypetin 3,7,3',4'-tetramethyl ether), 3,7-dihydroxy-3',4',5'-trimethoxyflavone (robinetin trimethyl ether), 5,3'-dihydroxy-6,7,4'-trimethoxyflavone (eupatorin), 5,7-dihydroxy-3',4',5'-trimethoxyflavone, 3,5-dimethoxyflavone, 3,6-dimethoxy flavone, 3,7-dimethoxyflavone, 3,2'-dimethoxyflavone, 3,3'-dimethoxyflavone, 3,4'-dimethoxyflavone, 5,7-dimethoxyflavone (dhrysin dimethyl ether), 5,2'-dimethoxyflavone, 5,3'-dimethoxyflavone, 5,4'-dimethoxyflavone, 6,7-dimethoxyflavone, 6,2'-dimethoxyflavone, 6,3'-dimethoxyflavone, 6,4'-dimethoxyflavone, 7,8-dimethoxyflavone, 7,2'-dimethoxyflavone, 7,3'-dimethoxyflavone, 7,4'-dimethoxyflavone, 2',3'-dimethoxyflavone, 2',4'-dimethoxyflavone, 3',4'-dimethoxyflavone, 3',4'-dimethoxyflavonol (3-hydroxy-3',4'-dimethoxyflavone), 2',3'-dimethoxy-3-hydroxyflavone, 2',4'-dimethoxy-3-hydroxyflavone, 3',4'-dimethoxy-a-naphthoflavone, 3',4'-dimethoxy-b-naphthoflavone, 3,4'-dimethoxy-5,7,3'-trihydroxyflavone (5,7,3'-trihydroxy-3,4'-dimethoxyflavone), diosmetin, diosmin (barosmin, diosmetin-7-rutinoside), eupatorin-5-methyl ether, fisetin (3,7,3',4'-tetrahydroxyflavone), flavone (2-Phenylchromone), fortunellin (acacetin-7-neohesperidoside), galangin (3,5,7-trihydroxyflavone), gardenin (5-hydroxy-6,7,8,3',4',5'-hexamethoxyflavone), geraldol, gossypetin (3,5,7,8,3',4'-hexahydroxyflavone), gossypin (3,5,7,8,3',4'-hexahydroxyflavone-8-glucoside), 5,6,7,3',4',5'-hexamethoxyflavone hinokiflavone (4',6"-O-biapigenin), homoorientin (isoorientin), 6-hydroxyapigenin (scutellarein), 5-hydroxy-7,4'-dimethoxy-6,8-dimethylflavone (eucalyptin), 3-hydroxy-6,4'-dimethoxyflavone, 3-hydroxy-7,4'-dimethoxyflavone, 3-hydroxy-2',4'-dimethoxy-6-methylflavone, 3-hydroxyflavone (flavonol), 5-hydroxyflavone (primuletin), 6-hydroxyflavone, 7-hydroxyflavone, 2'-hydroxyflavone, 3'-hydroxyflavone, 4'-hydroxyflavone, 6-hydroxyflavone-b-D-glucoside, 7-hydroxyflavone-b-d-glucoside (7-b-d-glucosyloxyflavone), 3-hydroxy-5-methoxyflavone (5-methoxyflavonol), 3-hydroxy-6-methoxyflavone (6-methoxyflavonol), 3-hydroxy-7-methoxyflavone (7-methoxyflavonol), 3-hydroxy-2'-methoxyflavone, 3-hydroxy-3'-methoxyflavone, 3-hydroxy-4'-methoxyflavone, 5-hydroxy-7-methoxyflavone (tectochrysin, methyl chrysin), 5-hydroxy-2'-methoxyflavone, 5-hydroxy-3'-methoxyflavone, 5-hydroxy-4'-methoxyflavone, 6-hydroxy-7-methoxyflavone, 6-hydroxy-2'-methoxyflavone, 6-hydroxy-3'-methoxyflavone, 6-hydroxy-4'-methoxyflavone, 7-hydroxy-2'-methoxyflavone, 7-hydroxy-3'-methoxyflavone, 7-hydroxy-4'-methoxyflavone (pratol), 8-Hydroxy-7-methoxyflavone, 4'-hydroxy-5-methoxyflavone, 4'-hydroxy-6-methoxyflavone, 4'-hydroxy-7-methoxyflavone, 4'-hydroxy-3'-methoxyflavone, 3-hydroxy-4'-methoxy-6-methylflavone, 3-hydroxy-6-methylflavone (6-methylflavonol), 7-hydroxy-3-methylflavone, 7-hydroxy-5-methylflavone, 2'-hydroxy-α-naphthoflavone, 2'-hydroxy-β-naphthoflavone, 4'-hydroxy-α-naphthoflavone, 4'-hydroxy-β-naphthoflavone, 5-hydroxy-3,7,3',4'-tetramethoxyflavone (quercetin tetramethyl ether), 3'-hydroxy-5,6,7,4'-tetramethoxyflavone, 3-hydroxy-3',4',5'-trimethoxyflavone, 3-hydroxy-6,2',3'-tri methoxyflavone, 3-hydroxy-6,2',4'-trimethoxyflavone, 3-hydroxy-6,3',4'-trimethoxyflavone, 3-hydroxy-7,2',3'-trimethoxyflavone, 3-hydroxy-7,2',4'-trimethoxyflavone, hyperoside with HPLC (hyperin, quercetin-3-galactoside), isoquercitrin (quercetin-3-glucoside), isorhamnetin, isorhamnetin-3-glucoside, isorhamnetin-3-rutinoside (narcisin), isorhoifolin (apigenin-7-rutinoside), isovitexin, kaempferide (3,5,7-trihydroxy-4'-methoxyflavone), kaempferide, kaempferol (3,5,7,4'-tetrahydroxyflavone), kaempferol-3-glucoside with HPLC (astragalin), kaempferol-7-neohesperidoside, kaempferol-3-rutinoside, kaempferol-3,7,4'-trimethyl ether, karanjin, linarin (acacetin-7-rutinoside), liquiritigenin monohydrate, luteolin (5,7,3',4'-tetrahydroxyflavone), luteolin-7,3'-diglucoside, luteolin-4'-glucoside, luteolin-7-glucoside, maritimein, 3-methoxyflavone, 5-methoxyflavone, 6-methoxyflavone, 7-methoxyflavone, 2'-methoxyflavone, 3'-methoxyflavone, 4'-methoxyflavone, 4'-methoxyflavonol, 6-methoxyluteolin, 2'-methoxy-a-naphthoflavone (2'-methoxy-7,8-benzoflavone), 2'-methoxy-b-naphthoflavone, 4'-methoxy-a-naphthoflavone, 6-methylflavone, 8-methylflavone, 6-methyl-4'-methoxyflavone, 8-methyl-4'-methoxyflavone, morin, myricetin (cannabiscetin, 3,5,7,3',4',5'-hexahydroxyflavone), myricitrin dihydrate (myricetin-3-rhamnoside dihydrate), myricitrin (myricetin-3-rhamnoside), neodiosmin (diosmetin-7-neohesperidoside), orientin (luteolin-8-c-glucoside), peltatoside (quercetin-3-arabinoglucoside), 3,7,3',4',5'-pentahydroxyflavone (robinetin, 5-hydroxyfisetin), 3,7,3',4', 5'-pentahydroxyflavone, 5,6,7,3',4'-pentamethoxyflavone (sinensetin), 5,7,3',4',5'-pentamethoxyflavone, quercetagetin, quercetin dihydrate (3,5,7,3',4'-pentahydroxyflavone dihydrate), quercetin, Quercetin-3-O-b-D-glucopyranosyl-6"-acetate, quercetin-3,5,7,3',4'-pentamethyl ether (3,5,7,3',4'-pentamethoxyflavone), quercetin-3-O-sulfate potassium salt, quercetin-3,7,3',4'-tetramethyl ether (retusin), quercitrin (quercetin-3-rhamnoside), quercitrin, rhoifolin (apigenin-7-neohesperidoside, apigenin-7-rhamnoglucoside), rhoifolin, robinin (kaempferol-3-robinoside-7-rhamnoside), rutin trihydrate, rutin trihydrate, saponarin, scutellarein tetramethyl ether (5,6,7,4'-tetramethoxyflavone), spiraeoside, sulfuretin (6,3',4'-Trihydroxyaurone), syringetin-3-galactoside, syringetin-3-glucoside, tamarixetin with HPLC (quercetin-4'-methylether, 4'-methoxy-3,5,7,3'-tetrahydroflavone), 3,5,7,4'-tetrahydroxy-3',5'-dimethoxyflavone (syringetin), 3,6,2',4'-tetrahydroxyflavone, 7,8,3',4'-tetrahydroxyflavone, 3,5,3',4'-tetrahydroxy-7-methoxyflavone (rhamnetin), 3,6,3',4'-tetramethoxyflavone, 5,7,3',4'-tetramethoxyflavone (luteolin tetramethyl ether), 7,8,3',4'-tetramethoxyflavone tiliroside, 6,8,4'-trichloroflavone, 3,6,4'-trihydroxyflavone, 3,7,4'-trihydroxyflavone (5-deoxykampferol, resokaempferol), 3,3',4'-trihydroxyflavone (3',4'-dihydroxyflavonol), 5,7,8-trihydroxyflavone, 5,7,2'-trihydroxyflavone, 5,3',4'-tri hydroxyflavone, 6,3',4'-trihydroxyflavone, 7,8,2'-trihydroxyflavone, 7,8,3'-trihydroxyflavone, 7,8,4'-trihydroxyflavone, 7,3',4'-trihydroxyflavone, 3,5,7-trihydroxy-3',4',5'-trimethoxyflavone (myricetin trimethyl ether), 5,7,4'-trimethoxyflavone (apigenin trimethyl ether), 7,3',4'-trimethoxyflavone, vitexin (apigenin-8-C-glucoside), vitexin-2"-O-rhamnoside (apigenin-8-C-glucoside-2'-rhamnoside).

In an alternative embodiment, the flavone includes one or more of kaempferol (3,5,7,4'-tetrahydroxyflavone), quercetin (3,5,7,3',4'-pentahydroxyflavone), myricetin (3,5,7,3',4', 5'-hexahydroxyflavone), apigenin (5,7,4'- trihydroxyflavone), and luteolin (5,7,3',4'-tetrahydroxyflavone). In one embodiment, the flavone is quercetin.

In-situ resins are formed in the rubber stock and involve the reaction of flavone and a methylene donor. The term "methylene donor" is intended to mean a chemical capable of reacting with the flavone and generate the resin in-situ. Examples of methylene donors which are suitable for use in the present invention include hexamethylenetetramine, hexamethoxymethylmelamine, hexaethoxymethylmelamine, iminomethoxymethylmelamine, iminoisobutoxymethylmelamine, lauryloxymethylpyridinium chloride, ethoxymethylpyridinium chloride trioxan and hexamethoxymethylmelamine. In addition, the methylene donors may be N-substituted oxymethylmelamines, of the general formula:

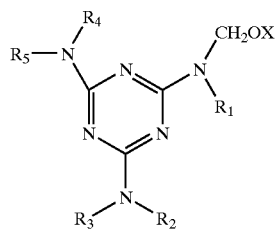

wherein X is hydrogen or an alkyl having from 1 to 8 carbon atoms, $R_1R_2$, $R_3$, $R_4$ and $R_5$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl) melamine and N,N'N"-tributyl-N,N',N"-trimethylolmelamine. The N-methylol derivatives of melamine are prepared by known methods.

The amount of methylene donor that is present in the rubber stock may vary. Typically, the amount of methylene donor that is present will range from about 0.02 phr to 15 phr. Preferably, the amount of methylene donor ranges from about 0.1 phr to 4 phr.

The weight ratio of the flavone to methylene donor may vary. Generally speaking, the weight ratio ranges from about 0.5:1 to 25:1 Preferably, the range is from 2:1 to 20:1.

It is readily understood by those having skill in the art that the rubber compositions used in tire components would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The rubber compound may contain various conventional rubber additives. Typical additions of carbon black comprise about 20 to 200 parts by weight of diene rubber (phr), preferably 50 to 100 phr.

A number of commercially available carbon blacks may be used. Included in the list of carbon blacks are those known under the ASTM designations N299, S315, N326, N330, M332, N339, N343, N347, N351, N358, N375, N539, N550 and N582. Such processing aids may be present and can include, for example, aromatic, naphthenic, and/or paraffinic processing oils. Typical amounts of tackifying resins, such as phenolic tackifiers, range from 1 to 3 phr. Silica, if used, may be used in an amount of about 5 to about 80 phr, often with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine, polymerized 1,2-dihydro-2, 2,4-trimethylquinoline and others, such as, for example, those disclosed in the *Vanderbilt Rubber Handbook* (1990), Pages 343 through 362. Typical amounts of antiozonants comprise about 1 to about 5 phr. Representative antiozonants may be, for example, those disclosed in the *Vanderbilt Rubber Handbook* (1990), Pages 363 through 367. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of the combination of the reaction product of the flavone and methylene donor.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 5 phr, or even, in some circumstances, up to about 8 phr, with a range of from about 3 to about 5 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.5 phr. In another embodiment, combinations of two or more accelerators which is generally used in the larger amount (0.5 to 2.0 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods which will be readily apparent to those having skill in such art.

The prepared tire of this invention is conventionally shaped and cured by methods known to those having skill in such art.

The invention may be better understood by reference to the following examples in which the parts and percentages are by weight unless otherwise indicated.

EXAMPLE I

In this example, the effect of replacing resorcinol with quercetin is demonstrated for rubber compounds containing carbon black. Four experimental rubber compounds were prepared in a lab Banbury mixer as indicated in Table 1. Physical properties of the compounds were evaluated as indicated in Table 2.

TABLE 1

|  | A | B | C | D |
|---|---|---|---|---|
| First Non-Productive Mixing Stage | | | | |
| Cis-1,4-polyisoprene rubber[1] | 100 | 100 | 100 | 100 |
| Carbon black[2] | 60 | 60 | 60 | 60 |
| Processing aids[3] | 2 | 2 | 2 | 2 |
| Fatty acid[4] | 2 | 2 | 2 | 2 |
| Zinc oxide | 5 | 5 | 5 | 5 |
| Resorcinol | 2 | 0 | 2 | 0 |
| Quercetin | 0 | 5 | 0 | 5 |
| Second Non-Productive Mixing Stage | | | | |
| Remill of First Non-productive Productive Mixing Stage | — | — | — | — |
| Antioxidant[5] | 0.75 | 0.75 | 0.75 | 0.75 |
| Zinc oxide | 3 | 3 | 3 | 3 |
| Sulfur[6] | 5 | 5 | 5 | 5 |
| Sulfenamide accelerator | 1 | 1 | 1 | 1 |
| Hexamethoxymethylmelamine | 28 | 28 | 0 | 0 |
| Hexamethylenetetramine | 0 | 0 | 2 | 2 |
| Retarder[7] | 0.2 | 0.2 | 0.2 | 0.2 |

[1] 50/50 blend of natural rubber and NAT2200 from The Goodyear Tire & Rubber Company
[2] N326, a carbon black ASTM designation
[3] Blend of naphthenic/parafinnic processing oil and phenolic tackifier
[4] Blend of stearic, palmitic and oleic acids
[5] Wingstay ® 100 from The Goodyear Tire & Rubber Company
[6] Insoluble sulfur, 80% active
[7] Phthalimide type

TABLE 2

|  | A | B | C | D |
|---|---|---|---|---|
| Rheometer, 155° C. | | | | |
| Maximum torque (dNm) | 52.1 | 34.5 | 51.2 | 35.1 |
| Minimum torque (dNm) | 2.8 | 2.7 | 3.2 | 2.9 |
| Delta torque (dNm) | 49.3 | 31.8 | 48 | 32.2 |
| T$_{90}$ (minutes) | 12.5 | 29.1 | 8.9 | 10.7 |
| Rheometer, 170° C. | | | | |
| Maximum torque (dNm) | 49.6 | 33.6 | 49.5 | 34 |
| Minimum torque (dNm) | 2.7 | 2.5 | 2.9 | 2.7 |
| Delta torque (dNm) | 46.9 | 31.1 | 46.6 | 31.3 |
| T$_{90}$ (minutes) | 4.4 | 9.9 | 3 | 3.9 |
| Stress-strain (35 minutes at 155° C.) | | | | |
| Tensile strength (MPa) | 16.6 | 20.5 | 15.7 | 19.7 |
| Elongation at break (%) | 295 | 400 | 240 | 355 |
| 100% modulus (MPa) | 4.5 | 4.2 | 5.4 | 4.1 |
| Rebound, 100° C. (%) | 56 | 61 | 60 | 64 |
| Hardness, 100° C. | 85 | 76 | 83 | 75 |
| Tear strength, N (95° C.) | 43 | 28 | 57 | 24 |
| Stress-strain (23 minutes at 170° C.) | | | | |
| Tensile strength (MPa) | 10.4 | 11.5 | 13.6 | 17.8 |
| Elongation at break (%) | 235 | 250 | 255 | 375 |
| 100% modulus (MPa) | 4.1 | 4.6 | 4.5 | 3.4 |
| Rebound, 100° C. (%) | 53 | 56 | 55 | 59 |
| Hardness, 100° C. | 83 | 78 | 81 | 71 |
| Tear strength, N (95° C.) | 37 | 29 | 52 | 40 |
| Wire Adhesion, N | | | | |
| 35 minutes at 155° C. | 464 | 713 | 929 | 635 |
| 90 minutes at 155° C. | 501 | 874 | 802 | 615 |
| 23 minutes at 170° C. | 425 | 785 | 777 | 595 |
| Cord Adhesion N 23 minutes at 170° C. | | | | |
| Polyester | 189 | 243 | 221 | 225 |
| Nylon | 213 | 295 | 187 | 186 |
| Falexten | 186 | 215 | 153 | 128 |
| Monsanto RPA 1%, 100° C., 1 hz | | | | |
| G' at 10% strain (KPa) | 4262 | 2171 | 3976 | 2683 |
| Tan delta at 10% strain | 0.186 | 0.119 | 0.145 | 0.118 |

Quercetin was evaluated as a replacement for resorcinol in a natural rubber compound which was reinforced with carbon black and also contained hexamethoxymethylmelamine, which reacts with resorcinol to form a resin for increased stiffness and improved adhesion to brass coated wire and various types of adhesive treated tire cords. The replacement of resorcinol with quercetin gave significant improvement in wire adhesion as the time or temperature of cure was increased vs the control compound. It also gave significant increase in adhesion to Flexten cord, polyester and nylon as compared to the control compound.

The high volatility of resorcinol when used to produce cord and wire adhesion resins in hot rubber formulations with methylene donors, has prompted compounding investigations into other less volatile naturally occurring compounds that are more environmentally friendly. The family of flavones was unexpectedly found to give better cord and wire adhesion in rubber recipes with hexamethoxymethylmelamine methylene donors than found with the resorcinol controls. The cord and wire adhesion of the quercetin/methylene donor resin system in the rubber was unexpectedly found to give increased adhesion with increasing cure temperatures of the rubber.

EXAMPLE II

In this example, the effect of varying the concentrations of quercetin and hexamethoxymethylmelamine (HMMMA) on wire adhesion to a rubber compound are shown. Rubber compounds were made following the recipe of Table 3 and cured 23 minutes at 170° C. The samples were then tested for wire adhesion at 23° C. as given in Table 4.

TABLE 3

| First Non-Productive Mixing Stage | |
|---|---|
| C-1,4-polyisoprene rubber | 100 |
| Carbon black | 60 |
| Processing aids | 2 |

TABLE 3-continued

| | |
|---|---|
| Fatty acid | 2 |
| Zinc oxide | 5 |
| Quercetin | Variable, 0 to 5 |
| Second Non-Productive Mixing Stage | |
| Remill of First Non-productive Mixing Stage | |
| Productive Mixing Stage | |
| Antioxidant | 0.75 |
| Zinc oxide | 3 |
| Sulfur | 5 |
| Sulfenamide accelerator | 1 |
| Retarder | 0.2 |
| Hexamethoxymethylmelamine | Variable, 0 to 5 |

TABLE 4

| Sample | Quercetin | HMMMA | Adhesion, N |
|---|---|---|---|
| E | 0 | 0 | 432 |
| F | 5 | 0 | 462 |
| G | 5 | 1.5 | 775 |
| H | 5 | 3 | 789 |
| I | 5 | 5 | 767 |
| J | 3 | 3 | 664 |
| K | 3 | 5 | 714 |
| L | 1 | 5 | 527 |

As seen in Table 4, the combination of quercetin and hexamethoxymethylmelamine in a rubber composition results in significant improvement in wire adhesion to the rubber composition.

EXAMPLE III

In this example, the effects of quercetin and a cashew nut oil phenolic novolac are compared for rubbers compound containing silica. Two experimental rubber compounds were prepared as indicated in Table 5. Physical properties of the compounds were evaluated as indicated in Table 6.

TABLE 5

| | Samples | |
|---|---|---|
| | M | N |
| Non-Productive Mixing Stage | | |
| Natural rubber | 100 | 100 |
| Silica[1] | 40 | 40 |
| Processing oil | 5 | 5 |
| Fatty acid | 2 | 2 |
| Zinc oxide | 8 | 8 |
| Silica coupler[2] | 8 | 6 |
| Productive Mixing Stage | | |
| Hexamethoxymethylmelamine | 3 | 3 |
| Metaphenylene bis maleimide | 2 | 2 |
| Sulfenamide accelerator | 1.1 | 1.1 |
| Antioxidant | 0.75 | 0.75 |
| Sulfur | 5 | 5 |
| Resin[3] | 2 | 0 |
| Quercetin | 0 | 4 |

TABLE 6

| | Samples | |
|---|---|---|
| Wire Adhesion, N | M | N |
| Cured 32 minutes at 150° C. | 523 | 685 |
| Cured 25 minutes at 170° C. | 636 | 686 |

[1]HiSil 210 from PPG Industries
[2]226S from DeGussa, 50% active, bis triethoxysilyl propyl disulfide
[3]Cashew nut oil modified phenolic novolac resin, HRJ 1195 from Schenectady Quercetin was compared with cashew nut oil phenolic novolac in a natural rubber compound which was reinforced with silica and also contained hexamethoxymethylmelamine. Quercetin gave significant improvement in wire adhesion as the time or temperature of cure was increased vs the control compound containing the cashew nut oil phenolic novolac.

While the embodiments described herein have been directed to a rubber composition and a tire, the present invention is not so limited. The rubber composition may also be used in various applications, including but not limited to power transmission belts, hoses, tracks, tires, air sleeves, and conveyor belts.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a component containing a rubber composition comprising (A) sulfur-vulcanized rubber compound; and (B) the reaction product of (1) a flavone; and (2) a methylene donor selected from the group consisting of hexamethylenetetramine, hexamethoxymethylmelamine, hexamethoxymethylmelamine, iminomethoxymethylmelamine, iminoisobutoxymethylmelamine, lauryloxymethylpyridinium chloride, ethoxymethylpyridinium chloride, trioxan hexamethoxymethylmelamine and N-substituted oxymethyl melamines of the formula:

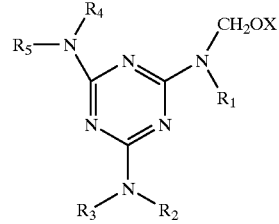

wherein X is selected from the group consisting of hydrogen and an alkyl having from 1 to 8 carbon atoms; and $R_1$, $R_2$, $R_3$, $R_4$ and $R_5$ are individually selected from the group consisting of hydrogen, an alkyl having from 1 to 8 carbon atoms, the group —$CH_2OX$ and their condensation products.

2. The tire of claim 1 wherein said rubber is selected from the group consisting of medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber, carboxylated acrylonitrile-butadiene rubber and mixtures thereof.

3. The tire of claim 1 wherein the weight ratio of flavone to methylene donor ranges from 0.5:1 to 25:1.

4. The tire of claim 1, wherein the amount of methylene donor is from about 0.02 to about 15 phr.

5. The tire of claim 1 wherein said methylene donor is selected from the group consisting of hexamethylenetetramine, hexamethoxymethylmelamine, imino-methoxymethylmelamine, and imino-isobutoxymethylmelamine.

6. The tire of claim 1 wherein said methylene donor is hexamethoxymethylmelamine.

7. The tire of claim 1 wherein said flavone is selected from the group consisting of kaempferol (3,5,7,4'-tetrahydroxyflavone), quercetin (3,5,7,3',4'-pentahydroxyflavone), myricetin (3,5,7,3',4',5'-hexahydroxyflavone), apigenin (5,7,4'-trihydroxyflavone), and luteolin (5,7,3',4'-tetrahydroxyflavone) and mixtures thereof.

8. The tire of claim 1 wherein said flavone is quercetin.

9. The tire of claim 1, wherein said rubber composition further comprises a reinforcement selected from carbon black and silica.

10. A rubber composition comprising
(A) sulfur-vulcanized rubber compound; and
(B) the reaction product of
(1) a flavone; and
(2) a methylene donor selected from the group consisting of hexamethylenetetramine, hexamethoxymethylmelamine, hexamethoxymethylmelamine, imino-methoxymethylmelamine, imino-isobutoxymethylmelamine, lauryloxymethylpyridinium chloride, ethoxymethylpyridinium chloride, trioxan hexamethoxymethylmelamine and N-substituted oxymethyl melamines of the formula:

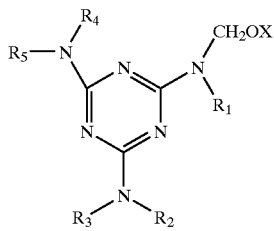

wherein X is selected from the group consisting of hydrogen and an alkyl having from 1 to 8 carbon atoms; and $R_1$, $R_2$, $R_3$, $R_4$ and $R_5$ are individually selected from the group consisting of hydrogen, an alkyl having from 1 to 8 carbon atoms, the group —$CH_2OX$ and their condensation products.

11. The composition of claim 10 wherein said rubber is selected from the group consisting of medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber, carboxylated acrylonitrile-butadiene rubber and mixtures thereof.

12. The composition of claim 10 wherein the weight ratio of flavone to methylene donor ranges from 0.5:1 to 25:1.

13. The composition of claim 10, wherein the amount of methylene donor is from about 0.02 to about 15 phr.

14. The composition of claim 10, wherein the amount of methylene donor is from about 0.1 to about 4 phr.

15. The composition of claim 10 wherein said methylene donor is selected from the group consisting of hexamethylenetetramine, hexamethoxymethylmelamine, imino-methoxymethylmelamine, and imino-isobutoxymethylmelamine.

16. The composition of claim 10 wherein said methylene donor is hexamethoxymethylmelamine.

17. The composition of claim 10 wherein said flavone is selected from the group conisting of kaempferol (3,5,7,4'-tetrahydroxyflavone), quercetin (3,5,7,3',4'-pentahydroxyflavone), myricetin (3,5,7,3',4',5'-hexahydroxyflavone), apigenin (5,7,4'-trihydroxyflavone), and luteolin (5,7,3',4'-tetrahydroxyflavone) and mixtures thereof.

18. The composition of claim 10 wherein said flavone is quercetin.

19. The composition of claim 10, wherein said rubber composition further comprises a reinforcement selected from carbon black and silica.

20. The composition of claim 10, wherein said rubber composition is a component of a power transmission belt, hose, track, tire, air sleeve, or conveyor belt.

21. The tire of claim 1, wherein said flavone is selected from the group consisting of acacetin (5,7-dihydroxy-4'-methoxyflavone; linarigenin), amentoflavone trihydrate, amentoflavone-7,4,4'-trimethyl ether (sciadopitysin), apigenin (5,7,4'-trihydroxyflavone), apigenin-7-glucoside (apigetrin, cosmetin, cosmiin), apiin (apigenin-7-apioglucoside), avicularin (quercetin-3-arabinoside), baicalein (5,6,7-trihydroxyflavone), baicalein trimethyl ether (5,6,7-trimethoxyflavone), baicalin (baicalein-7-O-glucuronide), 5,6-benzoflavone (β-naphthoflavone), 7,8-benzoflavone (α-naphthoflavone), 3'-benzyloxy-5,7-dihydroxy-3,4'-dimethoxyflavone, 3'-benzyloxy-5,6,7,4'-tetramethoxyflavone, 6-bromo-4'-chloroflavone, 6-bromoflavone 8-carboxy-3-methylflavone (3-methylflavone-8-carboxylic acid), 4'-chloro-6,8-dibromoflavone, 4'-chloroflavone, 6-chloroflavone, 4'-chloro-6-methyl flavone, 6-chloro-7-methylflavone, chrysoeriol, cupressuflavone trihydrate, datiscetin, datiscoside, 6,8-dibromoflavone, 6,4'-dichloroflavone, 6,8-dichloroflavone, 6,4'-dichloro-7-methylflavone, 3,7-dihydroxy-3',4'-dimethoxyflavone (fisetin-3',4'-dimethyl ether), 3,5-dihydroxyflavone, 3,6-dihydroxyflavone, 3,7-dihydroxyflavone, 3,2'-dihydroxyflavone, 3,3'-dihydroxyflavone, 5,7-dihydroxyflavone (chrysin), 5,2'-dihydroxyflavone, 5,3'-dihydroxyflavone, 5,4'-dihydroxyflavone, 6,7-dihydroxyflavone, 6,2'-dihydroxyflavone, 6,3'-dihydroxyflavone, 6,4'-dihydroxyflavone, 7,8-dihydroxyflavone, 7,2'-dihydroxyflavone, 7,3'-dihydroxyflavone, 7,4'-dihydroxyflavone, 2',3'-dihydroxyflavone, 2',4'-dihydroxyflavone, 3',4'-dihydroxyflavone (4-hydroxyflavonol), 5,6-dihydroxy-7-methoxyflavone (baicalein-7-methyl ether), 5,4'-dihydroxy-7-methoxyflavone (genkwanin; 7-methoxyapigenin), 3',4'-dihydroxy-a-naphthoflavone, 3',4'-dihydroxy-b-naphthoflavone, 5,8-dihydroxy-3,7,3',4'-tetramethoxyflavone (gossypetin 3,7,3',4'-tetramethyl ether), 3,7-dihydroxy-3',4',5'-trimethoxyflavone (robinetin trimethyl ether), 5,3'-dihydroxy-6,7,4'-trimethoxyflavone (eupatorin), 5,7-dihydroxy-3',4',5'-trimethoxyflavone, 3,5-dimethoxyflavone, 3,6-dimethoxyflavone, 3,7-dimethoxyflavone, 3,2'-dimethoxyflavone, 3,3'-dimethoxyflavone, 3,4'-dimethoxyflavone, 5,7- dimethoxyflavone (dhrysin dimethyl ether), 5,2'-dimethoxyflavone, 5,3'-dimethoxyflavone, 5,4'-dimethoxyflavone, 6,7-dimethoxyflavone, 6,2'-dimethoxyflavone, 6,3'-dimethoxyflavone, 6,4'-dimethoxyflavone, 7,8-dimethoxyflavone, 7,2'-dimethoxyflavone, 7,3'-dimethoxyflavone, 7,4'-dimethoxyflavone, 2',3'-dimethoxyflavone, 2',4'-dimethoxyflavone, 3',4'-dimethoxyflavone, 3',4'-dimethoxyflavonol (3-hydroxy-3',4'-dimethoxyflavone), 2',3'-dimethoxy-3-hydroxyflavone, 2',4'-dimethoxy-3-hydroxyflavone, 3',4'-dimethoxy-a -naphthoflavone, 3',4'-dimethoxy-b-naphthoflavone, 3,4'-dimethoxy-5,7,3'-trihydroxyflavone (5,7,3'-trihydroxy-3,4'-dimethoxyflavone), diosmetin, diosmin (barosmin, diosmetin-7-rutinoside), eupatorin-5-methyl ether, fisetin (3,7,3',4'-tetrahydroxyflavone), flavone (2-Phenylchromone), fortunellin (acacetin-7-neohesperidoside), galangin (3,5,7-trihydroxyflavone), gardenin (5-hydroxy-6,7,8,3',4',5'-hexamethoxyflavone), geraldol, gossypetin (3,5,7,8,3',4'-hexahydroxyflavone), gossypin (3,5,7,8,3',4'-hexahydroxyflavone-8-glucoside), 5,6,7,3',4',5'-hexamethoxyflavone hinokiflavone (4',6"-O-biapigenin), homoorientin (isoorientin), 6-hydroxyapigenin (scutellarein), 5-hydroxy-7,4'-dimethoxy-6,8-dimethylflavone (eucalyptin), 3-hydroxy-6,4'-dimethoxyflavone, 3-hydroxy-7,4'-dimethoxyflavone, 3-hydroxy-2',4'-dimethoxy-6-methylflavone, 3-hydroxyflavone (flavonol), 5-hydroxyflavone (primuletin), 6-hydroxyflavone, 7-hydroxyflavone, 2'-hydroxyflavone, 3'-hydroxyflavone, 4'-hydroxyflavone, 6-hydroxyflavone-b-D-glucoside, 7-hydroxyflavone-b-d-glucoside (7-b-d-glucosyloxyflavone), 3-hydroxy-5-methoxyflavone (5-methoxyflavonol), 3-hydroxy-6-methoxyflavone (6-methoxyflavonol), 3-hydroxy-7-methoxyflavone (7-methoxyflavonol), 3-hydroxy-2'-methoxyflavone, 3-hydroxy-3'-methoxyflavone, 3-hydroxy-4'-methoxyflavone, 5-hydroxy-7-methoxyflavone (tectochrysin, methyl chrysin), 5-hydroxy-2'-methoxyflavone, 5-hydroxy-3'-methoxyflavone, 5-hydroxy-4'-methoxyflavone, 6-hydroxy-7-methoxyflavone, 6-hydroxy-2'-methoxyflavone, 6-hydroxy-3'-methoxyflavone, 6-hydroxy-4'-methoxyflavone, 7-hydroxy-2'-methoxyflavone, 7-hydroxy-3'-methoxyflavone, 7-hydroxy-4'-methoxyflavone (pratol), 8-Hydroxy-7-methoxyflavone, 4'-hydroxy-5-methoxyflavone, 4'-hydroxy-6-methoxyflavone, 4'-hydroxy-7-methoxyflavone, 4'-hydroxy-3'-methoxyflavone, 3-hydroxy-4'-methoxy-6-methylflavone, 3-hydroxy-6-methyl flavone (6-methyl flavonol), 7-hydroxy-3-methylflavone, 7-hydroxy-5-methylflavone, 2'-hydroxy-α-naphthoflavone, 2'-hydroxy-β-naphthoflavone, 4'-hydroxy-α-naphthoflavone, 4'-hydroxy-β-naphthoflavone, 5-hydroxy-3,7,3',4'-tetramethoxyflavone (quercetin tetramethyl ether), 3'-hydroxy-5,6,7,4'-tetramethoxyflavone, 3-hydroxy-3',4',5'-trimethoxyflavone, 3-hydroxy-6,2',3'-trimethoxyflavone, 3-hydroxy-6,2',4'-trimethoxyflavone, 3-hydroxy-6,3',4'-trimethoxyflavone, 3-hydroxy-7,2',3'-trimethoxyflavone, 3-hydroxy-7,2',4'-trimethoxyflavone, hyperoside with HPLC (hyperin, quercetin-3-galactoside), isoquercitrin (quercetin-3-glucoside), isorhamnetin, isorhamnetin-3-glucoside, isorhamnetin-3-rutinoside (narcisin), isorhoifolin (apigenin-7-rutinoside), isovitexin, kaempferide (3,5,7-trihydroxy-4'-methoxyflavone), kaempferide, kaempferol (3,5,7,4'-tetrahydroxyflavone), kaempferol-3-glucoside with HPLC (astragalin), kaempferol-7-neohesperidoside, kaempferol-3-rutinoside, kaempferol-3,7,4'-trimethylether, karanjin, linarin (acacetin-7-rutinoside), liquiritigenin monohydrate, luteolin (5,7,3',4'-tetrahydroxyflavone), luteolin-7,3'-diglucoside, luteolin-4'-glucoside, luteolin-7-glucoside, maritimein, 3-methoxyflavone, 5-methoxyflavone, 6-methoxyflavone, 7-methoxyflavone, 2'-methoxyflavone, 3'-methoxyflavone, 4'-methoxyflavone, 4'-methoxyflavonol, 6-methoxyluteolin, 2'-methoxy-a-naphthoflavone (2'-methoxy-7,8-benzoflavone), 2'-methoxy-b-naphthoflavone, 4'-methoxy-a-naphthoflavone, 6-methylflavone, 8-methylflavone, 6-methyl-4'-methoxyflavone, 8-methyl-4'-methoxyflavone, morin, myricetin (cannabiscetin, 3,5,7,3',4',5'-hexahydroxyflavone), myricitrin dihydrate (myricetin-3-rhamnoside dihydrate), myricitrin (myricetin-3-rhamnoside), neodiosmin (diosmetin-7-neohesperidoside), orientin (luteolin-8-c-glucoside), peltatoside (quercetin-3-arabinoglucoside), 3,7,3',4',5'-pentahydroxyflavone (robinetin, 5-hydroxyfisetin), 3,7,3',4',5'-pentahydroxyflavone, 5,6,7,3',4'-pentamethoxyflavone (sinensetin), 5,7,3',4',5'-pentamethoxyflavone, quercetagetin, quercetin dihydrate (3,5,7,3',4'-pentahydroxyflavone dihydrate), quercetin, Quercetin-3-O-b-D-glucopyranosyl-6"-acetate, quercetin-3,5,7,3',4'-pentamethyl ether (3,5,7,3',4'-pentamethoxyflavone), quercetin-3-O-sulfate potassium salt, quercetin-3,7,3',4'-tetramethyl ether (retusin), quercitrin (quercetin-3-rhamnoside), quercetrin, rhoifolin (apigenin-7-neohesperidoside, apigenin-7-rhamnoglucoside), rhoifolin, robinin (kaempferol-3-robinoside-7-rhamnoside), rutin trihydrate, rutin trihydrate, saponarin, scutellarein tetramethyl ether (5,6,7,4'-tetramethoxyflavone), spiraeoside, sulfuretin (6,3',4'-Trihydroxyaurone), syringetin-3-galactoside, syringetin-3-glucoside, tamarixetin with HPLC (quercetin-4'-methylether, 4'-methoxy-3,5,7,3'-tetrahydroflavone), 3,5,7,4'-tetrahydroxy-3',5'-dimethoxyflavone (syringetin), 3,6,2',4'-tetrahydroxyflavone, 7,8,3',4'-tetrahydroxyflavone, 3,5,3',4'-tetrahydroxy-7-methoxyflavone (rhamnetin), 3,6,3',4'-tetramethoxyflavone, 5,7,3',4'-tetramethoxyflavone (luteolin tetramethyl ether), 7,8,3',4'-tetramethoxyflavone tiliroside, 6,8,4'-trichloroflavone, 3,6,4'-trihydroxyflavone, 3,7,4'-trihydroxyflavone (5-deoxykampferol, resokaempferol), 3,3',4'-trihydroxyflavone (3',4'-dihydroxyflavonol), 5,7,8-trihydroxyflavone, 5,7,2'-trihydroxyflavone, 5,3',4'-trihydroxyflavone, 6,3',4'-trihydroxyflavone, 7,8,2'-trihydroxyflavone, 7,8,3'-trihydroxyflavone, 7,8,4'-trihydroxyflavone, 7,3',4'-trihydroxyflavone, 3,5,7-trihydroxy-3',4',5'-trimethoxyflavone (myricetin trimethyl ether), 5,7,4'-trimethoxyflavone (apigenin trimethyl ether), 7,3',4'-trimethoxyflavone, vitexin (apigenin-8-C-glucoside), vitexin-2"-O-rhamnoside (apigenin-8-C-glucoside-2'-rhamnoside), and mixtures thereof.

22. The composition of claim 10, wherein said flavone is selected from the group consisting of acacetin (5,7-dihydroxy-4'-methoxyflavone; linarigenin), amentoflavone trihydrate, amentoflavone-7,4,4'-trimethyl ether (sciadopitysin), apigenin (5,7,4'-trihydroxyflavone), apigenin-7-glucoside (apigetrin, cosmetin, cosmiin), apiin (apigenin-7-apioglucoside), avicularin (quercetin-3-arabinoside), baicalein (5,6,7-trihydroxyflavone), baicalein trimethyl ether (5,6,7-trimethoxyflavone), baicalin (baicalein-7-O-glucuronide), 5,6-benzoflavone (β-naphthoflavone), 7,8-benzoflavone (α-naphthoflavone), 3'-benzyloxy-5,7-dihydroxy-3,4'-dimethoxyflavone, 3'-benzyloxy-5,6,7,4'-tetramethoxyflavone, 6-bromo-4'-chloroflavone, 6-bromoflavone 8-carboxy-3-methylflavone (3-methylflavone-8-carboxylic acid), 4'-chloro-6,8-dibromoflavone, 4'-chloroflavone, 6-chloroflavone, 4'-chloro-6-methylflavone, 6-chloro-7-methylflavone, chrysoeriol, cupressuflavone trihydrate, datiscetin, datiscoside, 6,8-dibromoflavone, 6,4'-dichloroflavone, 6,8-dichloroflavone, 6,4'-dichloro-7-methylflavone, 3,7-dihydroxy-3',4'-dimethoxyflavone (fisetin-3',4'-dimethyl ether), 3,5-dihydroxyflavone, 3,6-dihydroxyflavone, 3,7-dihydroxyflavone, 3,2'-dihydroxyflavone, 3,3'-dihydroxyflavone, 5,7-dihydroxyflavone (chrysin), 5,2'-dihydroxyflavone, 5,3'-dihydroxyflavone, 5,4'-dihydroxyflavone, 6,7-dihydroxyflavone, 6,2'-dihydroxyflavone, 6,3'-dihydroxyflavone, 6,4'-dihydroxyflavone, 7,8-dihydroxyflavone, 7,2'-dihydroxyflavone, 7,3'-dihydroxyflavone, 7,4'-dihydroxyflavone, 2',3'-dihydroxyflavone, 2',4'-dihydroxyflavone, 3',4'-dihydroxyflavone (4-hydroxyflavonol), 5,6-dihydroxy-7-methoxyflavone (baicalein-7-methyl ether), 5,4'-dihydroxy-7-methoxyflavone (genkwanin; 7-methoxyapigenin), 3',4'-dihydroxy-a-naphthoflavone, 3',4'-dihydroxy-b-naphthoflavone, 5,8-dihydroxy-3,7,3',4'-tetramethoxyflavone (gossypetin 3,7,3',4'-tetramethyl ether), 3,7-dihydroxy-3',4',5'-trimethoxyflavone (robinetin trimethyl ether), 5,3'-dihydroxy-6,7,4'-trimethoxyflavone (eupatorin), 5,7-dihydroxy-3',4',5'-trimethoxyflavone, 3,5-dimethoxyflavone, 3,6-dimethoxyflavone, 3,7-dimethoxyflavone, 3,2'-dimethoxyflavone, 3,3'-dimethoxyflavone, 3,4'-dimethoxyflavone, 5,7-dimethoxyflavone (dhrysin dimethyl ether), 5,2'-dimethoxyflavone, 5,3'-dimethoxyflavone, 5,4'-dimethoxyflavone, 6,7-dimethoxyflavone, 6,2'-dimethoxyflavone, 6,3'-dimethoxyflavone, 6,4'-dimethoxyflavone, 7,8-dimethoxyflavone, 7,2'-dimethoxyflavone, 7,3'-dimethoxyflavone, 7,4'-dimethoxyflavone, 2',3'-dimethoxyflavone, 2',4'-dimethoxyflavone, 3',4'-dimethoxyflavone, 3',4'-dimethoxyflavonol (3-hydroxy-3',4'-dimethoxyflavone), 2',3'-dimethoxy-3-hydroxyflavone, 2',4'-dimethoxy-3-hydroxyflavone, 3',4'-dimethoxy-a-naphthoflavone, 3',4'-dimethoxy-b-naphthoflavone, 3,4'-dimethoxy-5,7,3'-trihydroxyflavone (5,7,3'-trihydroxy-3,4'-dimethoxyflavone), diosmetin, diosmin (barosmin, diosmetin-7-rutinoside), eupatorin-5-methyl ether, fisetin (3,7,3',4'-tetrahydroxyflavone), flavone (2-Phenylchromone), fortunellin (acacetin-7-neohesperidoside), galangin (3,5,7-trihydroxyflavone), gardenin (5-hydroxy-6,7,8,3',4',5'-hexamethoxyflavone), geraldol, gossypetin (3,5,7,8,3',4'-hexahydroxyflavone), gossypin (3,5,7,8,3',4'-hexahydroxyflavone-8-glucoside), 5,6,7,3',4',5'-hexamethoxyflavone hinokiflavone (4',6"-O-biapigenin), homoorientin (isoorientin), 6-hydroxyapigenin (scutellarein), 5-hydroxy-7,4'-dimethoxy-6,8-dimethylflavone (eucalyptin), 3-hydroxy-6,4'-dimethoxyflavone, 3-hydroxy-7,4'-dimethoxyflavone, 3-hydroxy-2',4'-dimethoxy-6-methylflavone, 3-hydroxyflavone (flavonol), 5-hydroxyflavone (primuletin), 6-hydroxyflavone, 7-hydroxyflavone, 2'-hydroxyflavone, 3'-hydroxyflavone, 4'-hydroxyflavone, 6-hydroxyflavone-b-D-glucoside, 7-hydroxyflavone-b-d-glucoside (7-b-d-glucosyloxyflavone), 3-hydroxy-5-methoxyflavone (5-methoxyflavonol), 3-hydroxy-6-methoxyflavone (6-methoxyflavonol), 3-hydroxy-7-methoxyflavone (7-methoxyflavonol), 3-hydroxy-2'-methoxyflavone, 3-hydroxy-3'-methoxyflavone, 3-hydroxy-4'-methoxyflavone, 5-hydroxy-7-methoxyflavone (tectochrysin, methyl chrysin), 5-hydroxy-2'-methoxyflavone, 5-hydroxy-3'-methoxyflavone, 5-hydroxy-4'-methoxyflavone, 6-hydroxy-7-methoxyflavone, 6-hydroxy-2'-methoxyflavone, 6-hydroxy-3'-methoxyflavone, 6-hydroxy-4'-methoxyflavone, 7-hydroxy-2'-methoxyflavone, 7-hydroxy-3'-methoxyflavone, 7-hydroxy-4'-methoxyflavone (pratol), 8-Hydroxy-7-methoxyflavone, 4'-hydroxy-5-methoxyflavone, 4'-hydroxy-6-methoxyflavone, 4'-hydroxy-7-methoxyflavone, 4'-hydroxy-3'-methoxyflavone, 3-hydroxy-4'-methoxy-6-methyl flavone, 3-hydroxy-6-methylflavone (6-methylflavonol), 7-hydroxy-3-methyl flavone, 7-hydroxy-5-methylflavone, 2'-hydroxy-α-naphthoflavone, 2'-hydroxy-β-naphthoflavone, 4'-hydroxy-α-naphthoflavone, 4'-hydroxy-β-naphthoflavone, 5-hydroxy-3,7,3',4'-tetramethoxyflavone (quercetin tetramethyl ether), 3'-hydroxy-5,6,7,4'-tetramethoxyflavone, 3-hydroxy-3',4',5'-trimethoxyflavone, 3-hydroxy-6,2',3'-trimethoxyflavone, 3-hydroxy-6,2',4'-trimethoxyflavone, 3-hydroxy-6,3',4'-trimethoxyflavone, 3-hydroxy-7,2',3'-trimethoxyflavone, 3-hydroxy-7,2',4'-trimethoxyflavone, hyperoside with HPLC (hyperin, quercetin-3-galactoside), isoquercitrin (quercetin-3-glucoside), isorhamnetin, isorhamnetin-3-glucoside, isorhamnetin-3-rutinoside (narcisin), isorhoifolin (apigenin-7-rutinoside), isovitexin, kaempferide (3,5,7-trihydroxy-4'-methoxyflavone), kaempferide, kaempferol (3,5,7,4'-tetrahydroxyflavone), kaempferol-3-glucoside with HPLC (astragalin), kaempferol-7-neohesperidoside, kaempferol-3-rutinoside, kaempferol-3,7,4'-trimethylether, karanjin, linarin (acacetin-7-rutinoside), liquiritigenin monohydrate, luteolin (5,7,3',4'-tetrahydroxyflavone), luteolin-7,3'-diglucoside, luteolin-4'-glucoside, luteolin-7-glucoside, maritimein, 3-methoxyflavone, 5-methoxyflavone, 6-methoxyflavone, 7-methoxyflavone, 2'-methoxyflavone, 3'-methoxyflavone, 4'-methoxyflavone, 4'-methoxyflavonol, 6-methoxyluteolin, 2'-methoxy-a-naphthoflavone (2'-methoxy-7,8-benzoflavone), 2'-methoxy-b-naphthoflavone, 4'-methoxy-a-naphthoflavone, 6-methylflavone, 8-methylflavone, 6-methyl-4'-methoxyflavone, 8-methyl-4'-methoxyflavone, morin, myricetin (cannabiscetin, 3,5,7,3',4',5'-hexahydroxyflavone), myricitrin dihydrate (myricetin-3-rhamnoside dihydrate), myricitrin (myricetin-3-rhamnoside), neodiosmin (diosmetin-7-neohesperidoside), orientin (luteolin-8-c-glucoside), peltatoside (quercetin-3-arabinoglucoside), 3,7,3',4',5'-pentahydroxyflavone (robinetin, 5-hydroxyfisetin), 3,7,3',4',5'-pentahydroxyflavone, 5,6,7,3',4'-pentamethoxyflavone (sinensetin), 5,7,3',4',5'-pentamethoxyflavone, quercetagetin, quercetin dihydrate (3,5,7,3',4'-pentahydroxyflavone dihydrate), quercetin, Quercetin-3-O-b-D-glucopyranosyl-6"-acetate, quercetin-3,5,7,3',4'-pentamethyl ether (3,5,7,3',4'-pentamethoxyflavone), quercetin-3-O-sulfate potassium salt, quercetin-3,7,3',4'-tetramethyl ether (retusin), quercitrin (quercetin-3-rhamnoside), quercitrin, rhoifolin (apigenin-7-neohesperidoside, apigenin-7-rhamnoglucoside), rhoifolin, robinin (kaempferol-3-robinoside-7-rhamnoside), rutin trihydrate, rutin trihydrate, saponarin, scutellarein tetramethyl ether (5,6,7,4'-tetramethoxyflavone), spiraeoside, sulfuretin (6,3',4'-Trihydroxyaurone), syringetin-3-galactoside, syringetin-3-glucoside, tamarixetin with HPLC (quercetin-4'-methylether, 4'-methoxy-3,5,7,3'-tetrahydroflavone), 3,5,7,4'-tetrahydroxy-3',5'-dimethoxyflavone (syringetin), 3,6,2',4'-tetrahydroxyflavone, 7,8,3',4'-tetrahydroxyflavone, 3,5,3',4'-tetrahydroxy-7-methoxyflavone (rhamnetin), 3,6,3',4'-tetramethoxyflavone, 5,7,3',4'-tetramethoxyflavone (luteolin tetramethyl ether), 7,8,3',4'-tetramethoxyflavone tiliroside, 6,8,4'-trichloroflavone, 3,6,4'-trihydroxyflavone, 3,7,4'-trihydroxyflavone (5-deoxykampferol, resokaempferol), 3,3',4'-trihydroxyflavone (3',4'-dihydroxyflavonol), 5,7,8-trihydroxyflavone, 5,7,2'-trihydroxyflavone, 5,3',4'- trihydroxyflavone, 6,3',4'-trihydroxyflavone, 7,8,2'-trihydroxyflavone, 7,8,3'-trihydroxyflavone, 7,8,4'-trihydroxyflavone, 7,3',4'-trihydroxyflavone, 3,5,7-trihydroxy-3',4',5'-trimethoxyflavone (myricetin trimethyl ether), 5,7,4'-trimethoxyflavone (apigenin trimethyl ether), 7,3',4'-trimethoxyflavone, vitexin (apigenin-8-C-glucoside), vitexin-2"-O-rhamnoside (apigenin-8-C-glucoside-2'-rhamnoside), and mixtures thereof.

* * * * *